(12) United States Patent
Rude (10) Patent No.: US 7,036,187 B2
(45) Date of Patent: May 2, 2006

(54) REINFORCER FOR WRAPPED BAND FRICTION HINGES

(75) Inventor: Edward Rude, Columbia, MD (US)

(73) Assignee: Torqmaster, Inc., Stamford, CT (US)

( * ) Notice: Subject to any disclaimer, the term of this patent is extended or adjusted under 35 U.S.C. 154(b) by 0 days.

(21) Appl. No.: 10/824,192

(22) Filed: Apr. 13, 2004

(65) Prior Publication Data

US 2005/0028321 A1 Feb. 10, 2005

Related U.S. Application Data

(60) Provisional application No. 60/492,858, filed on Aug. 4, 2003.

(51) Int. Cl.
*E05D 11/08* (2006.01)

(52) U.S. Cl. .............................. 16/342; 16/387; 16/389

(58) Field of Classification Search .................. 16/342, 16/387, 382, 389, 266, 271, 342 R, 387 X; 361/187, 707, 818, 700, 680–683; 403/364; 248/225.21, 225.11, 224.8
See application file for complete search history.

(56) References Cited

U.S. PATENT DOCUMENTS

| | | | | |
|---|---|---|---|---|
| 2,620,508 A | * | 12/1952 | Goulooze ..................... | 16/248 |
| 2,968,059 A | * | 1/1961 | Munson ........................ | 16/265 |
| 3,257,937 A | * | 6/1966 | Mell ...................... | 99/421 HV |
| 3,263,368 A | * | 8/1966 | Hildum et al. ................ | 49/382 |
| 4,324,379 A | * | 4/1982 | Ovitz, III ................ | 248/224.8 |
| 4,971,281 A | * | 11/1990 | Steinbeck .............. | 248/222.13 |
| 5,079,799 A | | 1/1992 | Rude et al. | |
| 5,231,734 A | | 8/1993 | Rude et al. | |
| 5,379,183 A | * | 1/1995 | Okonsky et al. ............ | 361/681 |
| 5,406,678 A | | 4/1995 | Kaden et al. | |
| 5,771,540 A | | 6/1998 | Carpenter et al. | |
| 5,918,348 A | | 7/1999 | Carpenter et al. | |
| 6,098,821 A | * | 8/2000 | Dube et al. .................. | 211/184 |
| 6,154,926 A | * | 12/2000 | Formiller ..................... | 16/382 |
| 6,226,177 B1 | | 5/2001 | Rude et al. | |
| 6,430,777 B1 | * | 8/2002 | Lu ............................. | 16/340 |
| 6,470,532 B1 | | 10/2002 | Rude et al. | |
| 6,513,197 B1 | | 2/2003 | Rude et al. | |
| 6,584,646 B1 | * | 7/2003 | Fujita .......................... | 16/342 |
| 6,779,234 B1 | * | 8/2004 | Lu et al. ...................... | 16/340 |
| 6,804,859 B1 | * | 10/2004 | Lu et al. ...................... | 16/342 |

FOREIGN PATENT DOCUMENTS

| FR | 2275622 A | * | 2/1976 |
|---|---|---|---|
| FR | 2444773 A | * | 8/1980 |
| JP | 2004176446 A | * | 6/2004 |

* cited by examiner

*Primary Examiner*—Chuck Y. Mah
(74) *Attorney, Agent, or Firm*—Gottlieb,Rackman&Reisman (57) ABSTRACT

An improved friction hinge assembly is provided. The friction hinge assembly includes a rotatable shaft and a band having a circular spring portion for defining an opening in which the shaft is rotatably inserted in order to provide frictional torque between the shaft and the band spring portion. The band also includes a substantially flat tail portion having at least one edge. A reinforcing rib is disposed against at least one edge of said band tail portion in response to the shaft being inserted within the spring portion opening. The rib prevents flexing of said tail portion when said spring portion of said band rotates relative said shaft. Such flexing is prevented even if said shaft is at least partially retracted from within the spring portion opening by locking the reinforcing rib in position.

14 Claims, 7 Drawing Sheets

REINFORCER FOR WRAPPED BAND FRICTION HINGES

This invention claims priority of provisional application No. 60/492,858 filed Aug. 4, 2003. The invention is directed to a reinforcing element suitable for wrapped band friction hinges.

BACKGROUND OF THE INVENTION

Friction hinges are used for positioning display screens in lap-computers, medical equipment and video monitors in automobiles as well as many other applications. A commonly used method for making friction hinges utilizes a single turn of a wide spring material tightly fitted over a round shaft. One attachment to this type of hinge is made to the shaft, and the other is made to the tail, or end, of the flat spring material which extends tangentially from the circular wrap about the shaft.

This method is inexpensive and capable of providing good performance and reasonably long life. But it has the disadvantage that the tail of the flat spring material flexes under bending loads as the display is moved from one position to another. Such bending makes it difficult for the user to position the display accurately.

One prior art method for reinforcing the flat portion of the band consists in forming ridges or bending ribs into the band during forming. These methods do stiffen the band, but they make it much more difficult to form the band accurately, with the result that the frictional characteristics of the hinge are not as controllable.

Another method for stiffening the band uses a separate rib, perpendicular to the band, and attached to the flat portion of the band along one of its edges. The prior art includes an attachment method consisting of tabs formed as a part of the band which engage slots in the reinforcing rib. Failures of this method occur when the reinforcing rib moves so as to lose its engagement with the tab of the band.

Accordingly, it would be desirable to provide a method for ensuring permanent and firm attachment of the reinforcing rib to the edge of the band without incurring significant extra cost in tooling, material, or assembly labor.

SUMMARY OF THE INVENTION

Generally speaking, in accordance with the invention, an improved friction hinge assembly is provided. The friction hinge assembly includes a rotatable shaft and a band having a circular spring portion for defining an opening in which the shaft is rotatably inserted in order to provide frictional torque between the shaft and the band spring portion. The band also includes a substantially flat tail portion having at least one edge.

Significantly, when the shaft is fully inserted within the spring portion opening, it urges a reinforcing rib to abut against the edge of the tail portion of the band. This prevents flexing of the tail portion when the spring portion of the band rotates relative to the shaft.

In accordance with the invention, the construction of the reinforcing rib and the band prevents movement of the reinforcing rib away from the edge of the band's tail portion even when the shaft is partly retracted away from within the spring portion opening. In particular, the edge of the tail portion includes at least one tab for selective reception through at least one corresponding slot formed in the reinforcing rib. At least one of the tabs which depends from the edge of the band tail portion is formed with a hook element. This hook element is designed for grabbing a portion of the reinforcing rib once the tab is received through said corresponding slot that is formed in the reinforcing rib. As a result, rib movement is prevented.

In its preferred design, the inventive hinge assembly has the reinforcing rib formed with an opening through which the shaft passes therethrough when inserted in the opening of the spring portion of the band. Notably, the opening of the reinforcing rib and the opening of the spring portion of the band are designed to be unaligned when the depending tab of the tail portion edge is received through its corresponding slot in the rib. On the other hand, the rib opening and the opening of the spring portion are in an aligned condition once the hook element of the depending tab grabs a portion of the reinforcing rib—this is achieved by adjusting the relative position of the reinforcing rib with respect to the tail portion of the band.

Accordingly, it is an object of the invention to provide an improved friction hinge assembly.

It is another object of the invention to provide an improved friction hinge assembly which ensures permanent and firm attachment of a reinforcing rib along the edge of the band tail portion.

Another object of the invention is to provide an improved friction hinge assembly which prevents flexing of the tail portion of the band due to bending loads as the hinge display is moved from one position to another.

Still other objects and advantages of the invention will, in part, be obvious and will, in part, be apparent from the following description.

BRIEF DESCRIPTION OF THE DRAWINGS

Further understanding of our invention will become apparent upon consideration of the following detailed description in conjunction with the drawings, in which.

DETAILED DESCRIPTION

Figure 1:
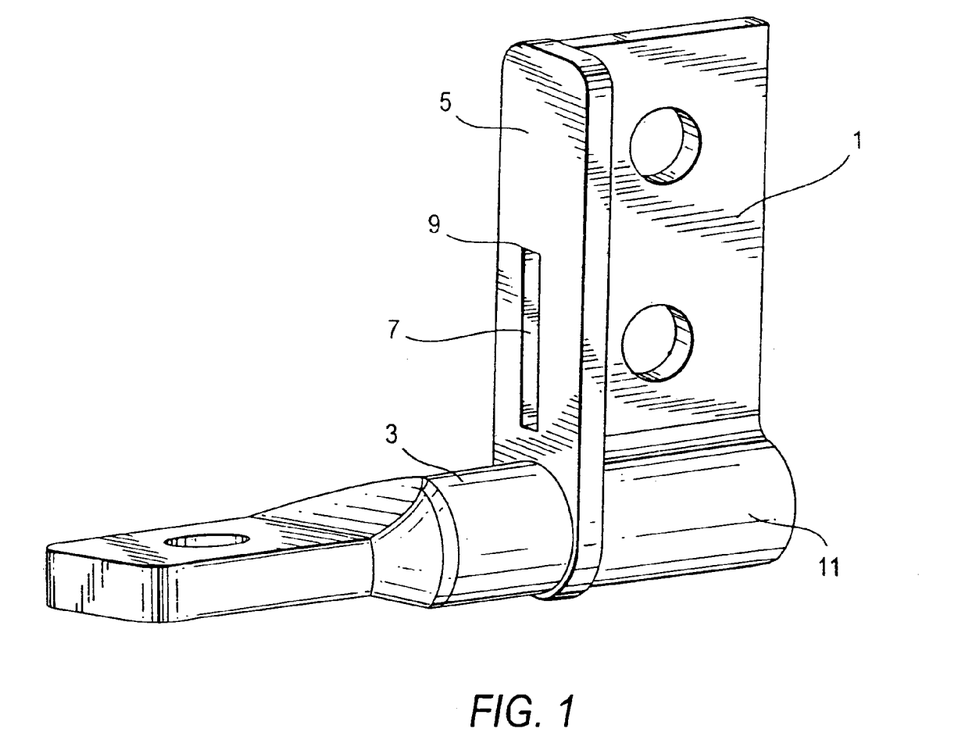
FIG. 1 is a perspective view which shows the prior art design of stiffening with a perpendicular rib attached by straight tabs that extend from an edge of the band.

Referring now to FIG. 1, a hinge of the prior art that uses a separate stiffener is shown. The hinge is comprised of band 1, shaft 3 and stiffener or reinforcing rib 5. Band I has a tab 7 extending therefrom into slot 9 of stiffener 5. Band 1 includes a circular spring portion 11 into which shaft 3 is inserted. Shaft 3 holds stiffener 5 in position against the edge or tail portion of the band 1 only so long as shaft 3 remains fully inserted within circular portion 11. If, during repeated operations of the hinge, shaft 3 becomes slightly retracted from circular portion 11 of band 1, then stiffener 5 can assume the position shown in FIG. 2, wherein tab 7 has been disengaged from slot 9 so that band 1 is no longer stiffened by means of stiffener 5.

Figure 3:
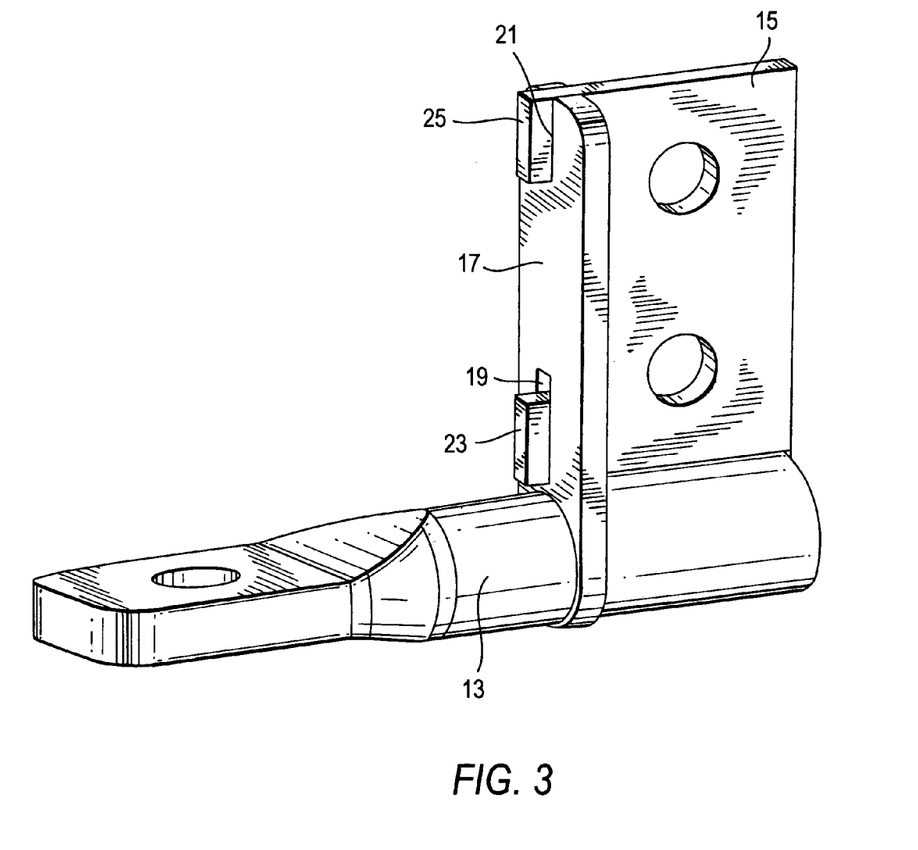
FIG. 3 is a perspective view which shows the inventive hinge fully assembled with its stiffener in place.
Figure 4:
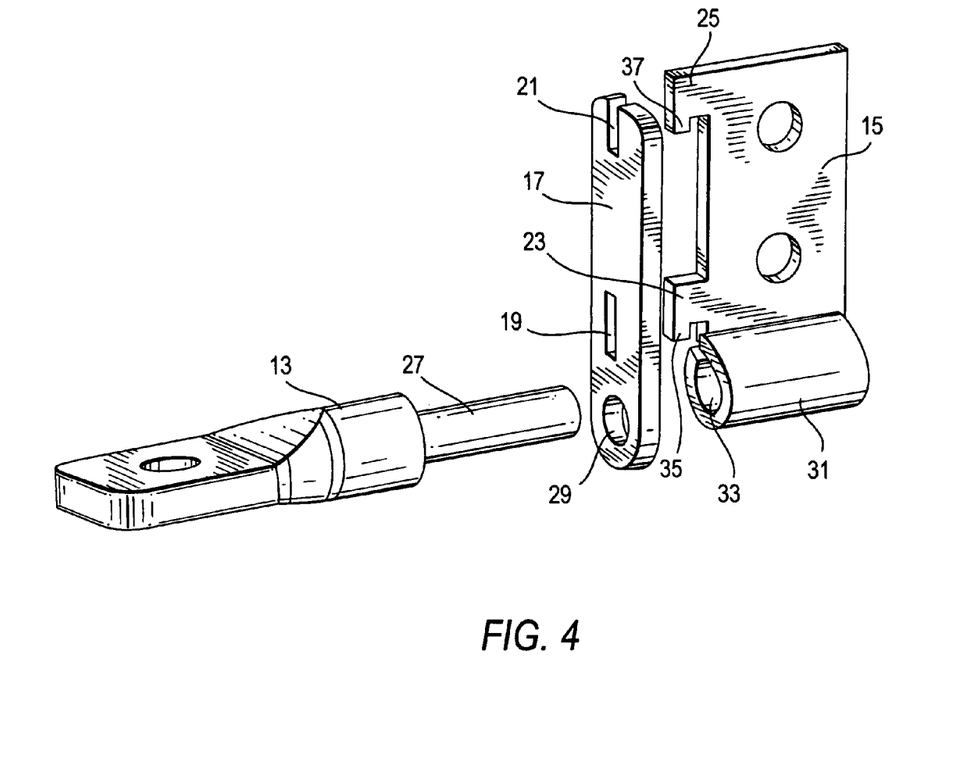
FIG. 4 is an exploded perspective view of the band, stiffener and shaft of the inventive hinge.

The preferred embodiment of the hinge of our invention is shown assembled in FIG. 3 and FIG. 4. Band 15 has two tabs 23, 25 depending from the edge thereof for engaging slots 19, 21 in stiffener or rib 17. Stiffener 17 has two slots, first slot 19 and second slot 21, for engaging tabs 23 and 25 respectively of band 15. Shaft 13 has turned down portion 27 which fits, with slight clearance, through hole 29 in stiffener 17, and into the tightly fitting, friction producing opening 33 of circular spring portion 31 formed at one end of band 15.

Figure 5:
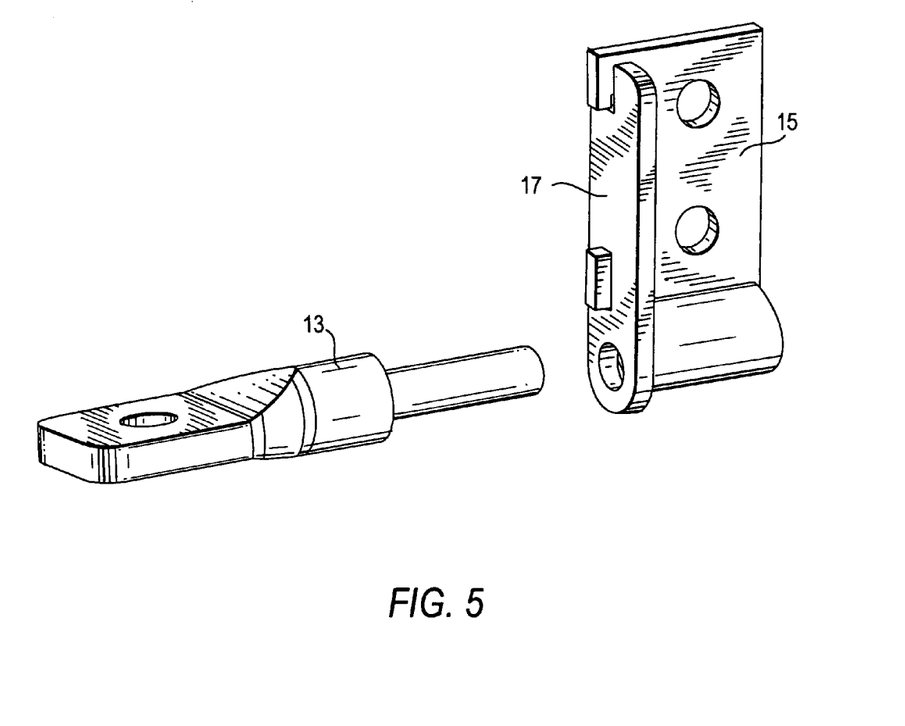
FIG. 5 is an exploded perspective view which shows the stiffener engaging the band, but not yet in its final position.
Figure 6:
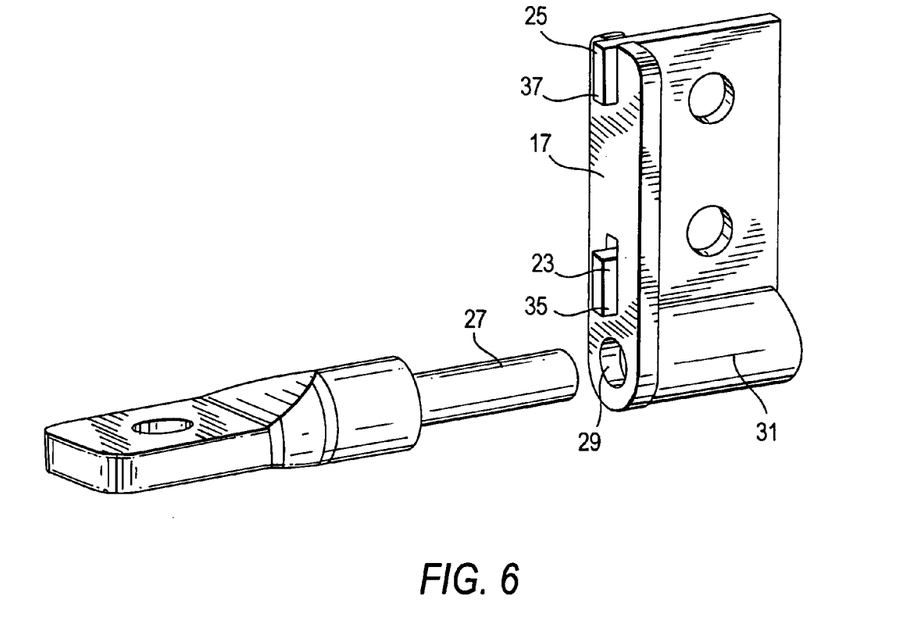
FIG. 6 is an exploded perspective view which depicts the stiffener in its final position and ready for reception of the shaft.

As can be seen in FIG. 4, shaft 13 is aligned with opening 33 in circular spring portion 31 of band 15. But hole 29 in stiffener 17 is not in alignment. As shown in FIG. 5, it can be seen that hole 29 of stiffener 17 is out of alignment with shaft 13 and opening 33 in band 15. In order for hole 29 and opening 33 to align, it is necessary to move stiffener 17 laterally over tabs 23 and 25 and then move it vertically upward until the holes are aligned. This is shown in FIG. 6, where it can be seen that stiffener 17 has been moved to engage hooks 35 and 37 of engaging tabs 23 and 25 with stiffener hole 29 aligned with both turned down portion 27 of shaft 13 and opening 33 in the circular portion 31 of band 15. Hooks 35 and 37 of engaging tabs 23 and 25 are so configured that stiffener 17 fits snugly into the space therebetween and the body of band 15. Importantly, slots 19 and 21 of stiffener 17 must be sized to permit tab 23 with its hook 35 and tab 25 with its hook 37 to pass respectively therethrough. Then, when stiffener 17 is moved to align hole 29 with opening 33 of circular portion 31, hooks 35 and 37 overlap the material of stiffener 17 at the ends of each of the slots.

With hole 29 in stiffener 17 and opening 33 in the circular portion 31 of band 15 in alignment, turned down portion 27 of shaft 13 can be fully inserted into the assembly, thereby locking stiffener 17 and band 15 together.

Figure 7:
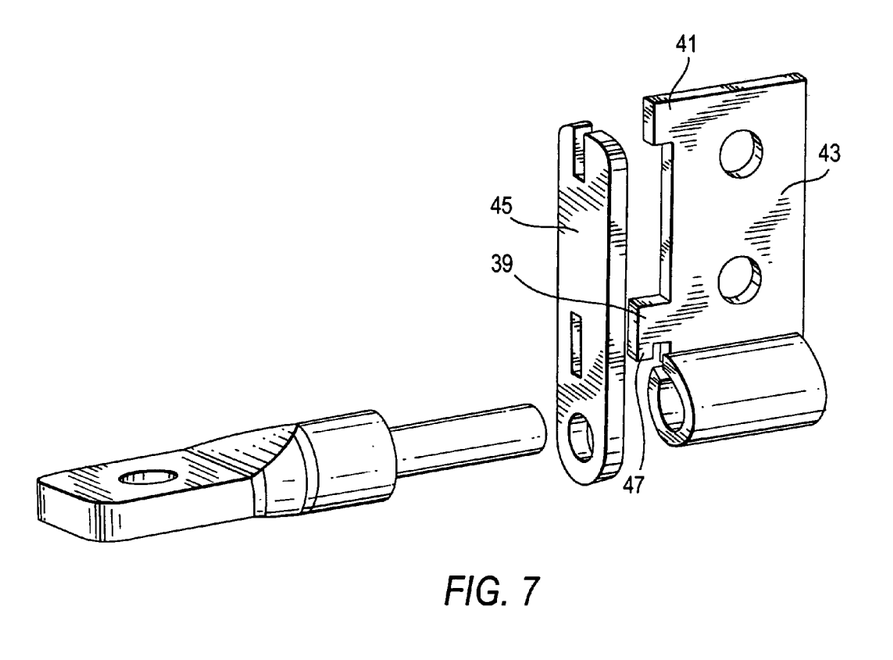
FIG. 7 is an exploded perspective view which illustrates one alternative embodiment of the inventive hinge.

An alternative configuration of the invention is shown FIG. 7. In this embodiment, two tabs 39 and 41 are used to engage slots in stiffener 45. But only tab 39 has a hook 47. Tab 41 is formed without a hook to simplify the stamping operation. The result is that the engagement of stiffener 45 and band 43 is slightly less secure than in the embodiment of FIGS. 3–6.

Figure 2:
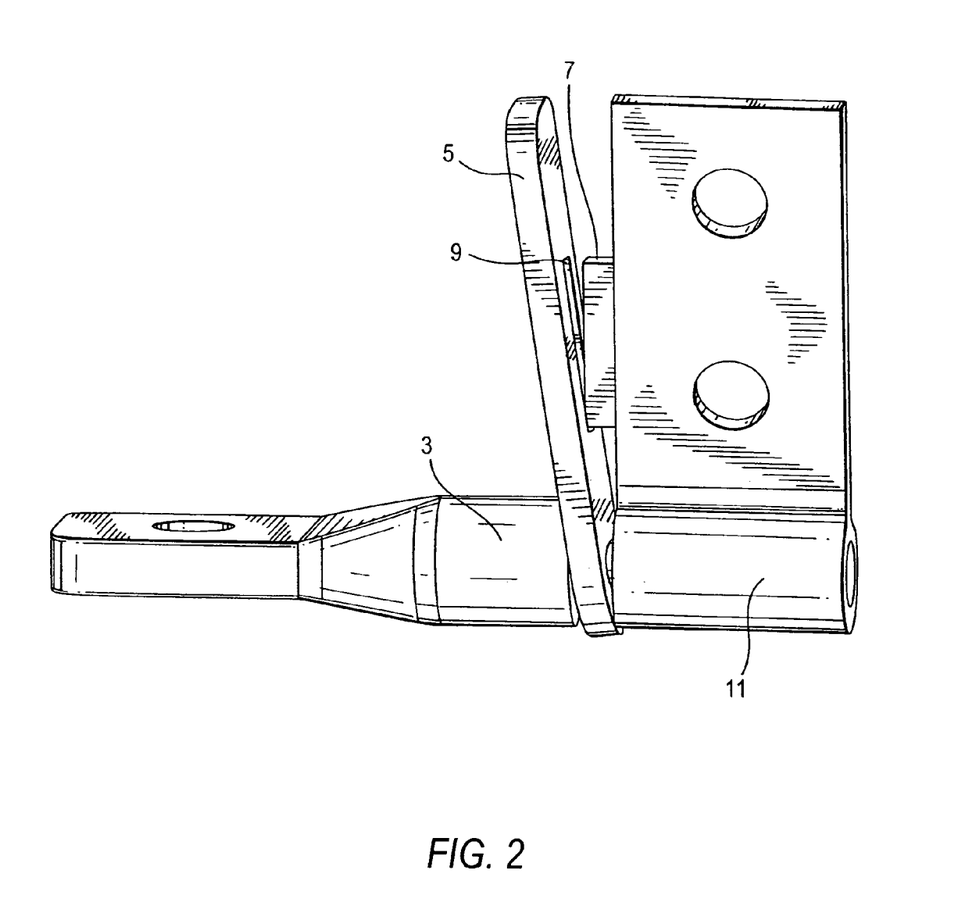
FIG. 2 is a front perspective view which depicts the prior art stiffening design show in FIG. 1 in a failed condition.

It is also possible to use our invention with only a single tab, as in the hinge of FIGS. 1 and 2, but with the addition of a hook to ensure the engagement of the stiffener and the band. But this arrangement will probably provide reduced stiffness compared to the use of two tabs and is this less preferred.

It will thus be seen that the objects set forth above among those made apparent from the preceding description are efficiently attained and, since certain changes may be made in the construction of the invention without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

| Parts | FIG. | Name used |
|---|---|---|
| 1 | 2 | band—prior art |
| 3 | 1,2 | shaft—prior art |
| 5 | 1,2 | stiffener—prior art |
| 7 | 1,2 | tab—prior art |
| 9 | 1,2 | slot—prior art |
| 11 | 1,2 | circular portion—prior art band |
| 13 | 3,4 | shaft—preferred embodiment |
| 15 | 3,4, | band—preferred embodiment |
| 17 | 3,4 | stiffener—preferred embodiment |
| 19 | 3,4 | first slot—preferred embodiment |
| 21 | 3,4, | second slot—preferred embodiment |
| 23 | 3,4 | first tab—preferred embodiment |
| 25 | 3,4 | second tab—preferred embodiment |
| 27 | 3,4 | turned down portion—shaft—preferred embodiment |
| 29 | 3,4 | clearance hole in stiffener—preferred embodiment |
| 31 | 3,4 | circular portion of band—preferred embodiment |
| 33 | 3,4 | hole in circular portion of band—preferred embodiment |
| 35 | 3,4 | hook of first tab—preferred embodiment |
| 37 | 3,4 | hook of second tab—preferred embodiment |
| 39 | | |

The invention claimed is:

1. A friction hinge comprising:
a rotatable shaft defining an axis;
a band having a circular spring portion which defines an opening in which said shaft is rotatably inserted therewithin for providing frictional torque between said shaft and said spring portion of said band, said band further including tail portion having at least one edge;
a reinforcing rib disposed against said at least one edge of said band tail portion in response to said shaft being fully inserted within said spring portion opening, said rib preventing flexing of said tail portion when said spring portion of said band rotates relative said shaft; and
a movement preventing member providing engagement between said reinforcing rib and said band tail portion to prevent axial movement between said reinforcing rib and said at least one edge of said tail portion when said shaft is at least partially retracted from within said spring portion opening.

2. The hinge of claim 1, wherein said member comprises at least one engaging tab depending from said at least one edge of said band tail portion and designed for grabbing a portion of said rib.

3. The hinge of claim 2, wherein said rib is formed with at least one slot through which said tab is selectively received.

4. The hinge of claim 3, wherein said at least one tab is formed with a hook element for abutting against a portion of said rib once said tab is received through said at least one slot.

5. The hinge of claim 4, wherein said rib is further formed with an opening through which said shaft passes therethrough when inserted within said opening of said band spring portion.

6. The hinge of claim 5, wherein said opening of said rib and said opening of said spring portion are in a first unaligned condition when said at least one tab is received through said at least one slot.

7. The hinge of claim 6, wherein said opening of said rib and said opening of said spring portion are in a second aligned condition when said hook element of said at least one tab is positioned to abut against a portion of said rib.

8. The hinge of claim 7, wherein said rib is movable relative to the said band between said first and second positions in a direction corresponding to said tail portion edge.

9. For a friction hinge which includes a rotatable shaft and a band having a circular spring portion which defines an opening in which said shaft is rotatably inserted therewithin for providing frictional torque between said shaft and said spring portion of said band, said band also having a tail portion with at least one running edge, a method for preventing flexing of said tail portion of said band when said spring portion of said band rotates relative to said shaft, the method comprising the steps of:

positioning a reinforcing rib that is formed with an opening through which said shaft can pass against said at least one edge of said band tail portion;

passing an engaging tab which depends from said at least one edge of said band tail portion through a corresponding slot formed in said rib;

adjusting the relative positions of said reinforcing rib and said band in order that said tab abuts a portion of said rib with said opening of said rib and said opening of said band spring portion being in an aligned condition; and     inserting said shaft axially through said aligned rib and said spring portion openings in order to move said reinforcing rib in a position against said at least one edge of said band, wherein in said position, the reinforcing rib and said flexible bend are constructed and arranged to prevented them from separating axially from each other when said shaft is partially retracted from said rib.

10. A friction hinge comprising:

a rotatable shaft defining an axis;

a band defined by a spring portion having an opening in which the shaft is rotatably inserted therewithin for providing frictional torque between said shaft and said band spring portion, said band also including a tail portion depending from said spring portion and having at least one edge;

a reinforcing rib; and a movement preventing member, said reinforcing rib being locked in position against said at least one edge of said band tail portion by said movement preventing member for preventing axial movement of said rib with respect to said band when said rotatable shaft is retracted from said band to prevent flexing of said tail portion.

11. The hinge of claim 10, wherein said rib is formed with a slot through which an engaging tab that extends from said band tail portion is inserted.

12. The hinge of claim 11, wherein said tab of said tail portion abuts a portion of said rib adjacent said slot after insertion therewithin in response to an adjustment in position of said rib relative said band tail portion.

13. The hinge of claim 12, wherein said rib is formed with an opening which is designed to be aligned with said spring portion opening when said tab of said tail portion abuts a portion of said rib adjacent said slot after insertion therewithin.

14. The hinge of claim 13, wherein said aligned rib and spring portion openings have said shaft received therethrough.

* * * * *